(12) United States Patent  
Jeon

(10) Patent No.: US 8,913,956 B2
(45) Date of Patent: Dec. 16, 2014

(54) MOBILE DEVICE AND METHOD OF ACCESSING CHANNEL USING MOBILE DEVICE

(75) Inventor: Seung Woo Jeon, Gyeonggi-Do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 13/179,621

(22) Filed: Jul. 11, 2011

(65) Prior Publication Data

US 2012/0083211 A1   Apr. 5, 2012

(30) Foreign Application Priority Data

Oct. 1, 2010 (KR) ........................ 10-2010-0096050

(51) Int. Cl.
| | | |
|---|---|---|
| *H04B 7/00* | (2006.01) | |
| *H04W 52/14* | (2009.01) | |
| *H04B 17/00* | (2006.01) | |
| *H04W 52/50* | (2009.01) | |
| *H04W 52/24* | (2009.01) | |
| *H04W 52/36* | (2009.01) | |
| *H04W 52/12* | (2009.01) | |

(52) U.S. Cl.
CPC ............. *H04B 17/0045* (2013.01); *Y02B 60/50* (2013.01); *H04W 52/146* (2013.01); *H04W 52/367* (2013.01); *H04W 52/50* (2013.01); *H04W 52/12* (2013.01); *H04W 52/246* (2013.01)
USPC ........................................................ 455/41.2

(58) Field of Classification Search
USPC ........... 455/41.2, 522, 127.1, 127.5, 436, 446
See application file for complete search history.

(56) References Cited

U.S. PATENT DOCUMENTS

| | | | |
|---|---|---|---|
| 5,923,650 A * | 7/1999 | Chen et al. ..................... | 370/331 |
| 7,474,887 B2 | 1/2009 | Chandra et al. | |
| 2005/0143119 A1 | 6/2005 | Chandra et al. | |
| 2006/0028984 A1 | 2/2006 | Wu et al. | |
| 2008/0076352 A1 * | 3/2008 | Der .............................. | 455/41.2 |
| 2008/0159215 A1 * | 7/2008 | Hosein .......................... | 370/329 |
| 2008/0192666 A1 | 8/2008 | Koskan et al. | |
| 2008/0240009 A1 * | 10/2008 | Min et al. ...................... | 370/311 |

FOREIGN PATENT DOCUMENTS

| | | |
|---|---|---|
| KR | 10-2006-0010553 | 2/2006 |
| KR | 10-2009-0012427 | 2/2009 |
| KR | 10-2009-0108850 | 10/2009 |

* cited by examiner

*Primary Examiner* — Hai V. Nguyen
*Assistant Examiner* — Joseph Tam
(74) *Attorney, Agent, or Firm* — NSIP Law

(57) ABSTRACT

Disclosed is a mobile device to calculate an energy efficiency degree corresponding to a ratio of an amount of transmission of a data packet to an expected energy consumption, in response to the transmission of the data packet to a base station, to set a threshold value of the energy efficiency degree, and to determine whether to access a channel of the base station, based on the threshold value of the energy efficiency degree.

20 Claims, 6 Drawing Sheets

MOBILE DEVICE AND METHOD OF ACCESSING CHANNEL USING MOBILE DEVICE

CROSS-REFERENCE TO RELATED APPLICATION(S)

This application claims the benefit under 35 U.S.C. §119(a) of Korean Patent Application No. 10-2010-0096050, filed on Oct. 1, 2010, in the Korean Intellectual Property Office, the entire disclosure of which is incorporated herein by reference for all purposes.

BACKGROUND

1. Field

The following description relates to a method of setting a data transmission power and accessing a channel for enhancing an energy efficiency during a data transmission of a terminal using a short range wireless communication.

2. Description of Related Art

A short range wireless communication, such as a wireless local area network (WLAN), a personal area network (PAN), and the like, may be widely used in various fields as a core technology supporting various voice and data communication services.

Various contents usable by various mobile devices delivered through a short range wireless communication network have been developed recently, and a capacity of a battery driving a mobile device may be very important in driving the mobile device to use the contents.

Accordingly, a power management policy for reducing an amount of battery consumption of the mobile device is becoming a significant issue.

Generally, a limited battery capacity of the mobile device may not enable the mobile device to be used for a relatively long period of time. As applications consuming a large amount of power, such as a game, a high-definition multimedia, and the like, are rapidly introduced, an actual period of time available for using a device is decreasing.

Thus, a reduction in a power consumption of a communication consuming a considerable part of a total power consumption in the wireless communication device is expected to contribute to satisfying a consumer desire for efficient use of battery energy and an extended period of use of a device between recharges.

The short range wireless communication generally adopts a data transmission channel access and transmission scheme exchanging data by contentiously accessing the same channel of a base station and a terminal.

The data transmission channel access and transmission scheme may be easily implemented, and may provide an efficient use of common resources. However, since an energy efficiency of a data transmission may not be considered during a channel access, an excessive amount of energy may be consumed when accessing a channel and transmitting data.

In the data transmission channel access and transmission scheme, the terminal may generally use a fixed amount of power when transmitting data, increasing a waste of the battery by degrading the energy efficiency.

In the short range wireless communication, the aforementioned battery usage and the use of the fixed amount of power may account for a large portion of the energy consumption, and may be a primary consideration for improving the energy efficiency.

SUMMARY

In one general aspect, there is provided a mobile device, including: a calculation unit configured to calculate an energy efficiency degree corresponding to a ratio of an amount of transmission of a data packet to an expected energy consumption, in response to the transmission of the data packet to a base station, a setting unit configured to set a threshold value of the energy efficiency degree, and a determining unit configured to determine whether to access a channel of the base station, based on the threshold value of the energy efficiency degree.

In the mobile device, the calculation unit may be further configured to calculate the energy efficiency degree, based on a data transmission link environment between the base station and the mobile device.

In the mobile device, the determining unit may be further configured to determine an amount of electric power according to the transmission of the data packet, based on the threshold value of the energy efficiency degree.

In the mobile device, the energy efficiency degree may be determined based on an amount of electric power consumed for transmitting the data packet to the base station.

In the mobile device, the threshold value of the energy efficiency degree may be determined by reflecting, in real time, a residual amount of a battery and a state of a queue including the data packet.

In the mobile device, the setting unit may be further configured to set the threshold value ($TH_t$) of the energy efficiency degree according to:

$$TH_t = \alpha \cdot TH_{min} + \beta \cdot \left\{ \left(1 - \frac{B_C}{B_{max}}\right) \cdot TH_{max} \right\}$$

$$\left(\alpha + \beta = 1, \alpha = \frac{Q_C}{Q_{max}}\right)$$

wherein: $TH_{min}$ indicates a minimal value of the threshold value, $TH_{max}$ indicates a maximal value of the threshold value, $B_{max}$ indicates a maximal capacity of the battery, $B_c$ indicates a current capacity of the battery, $Q_{max}$ indicates a maximal size of the queue, $Q_c$ indicates a current size of the queue, and $\alpha$ and $\beta$ indicate weighting factors.

In the mobile device, the setting unit may be further configured to set the threshold value ($TH_t$) of the energy efficiency degree to increase in inverse proportion to the current capacity of the battery, in response to a decrease in the current size of the queue.

In the mobile device, the setting unit may be further configured to set the threshold value ($TH_t$) of the energy efficiency degree to decrease, in response to an increase in the current size of the queue.

In the mobile device, in response to at least two queues existing, the setting unit may be further configured to either: set the threshold value of the energy efficiency degree by totaling up sizes of the at least two queues, or set the threshold value of the energy efficiency degree based on a queue including a maximal current size, among the at least two queues.

In the mobile device, the determining unit may be further configured to determine the amount of electric power enabling the energy efficiency degree to be greater than or equal to the threshold value of the energy efficiency degree.

In the mobile device, the determining unit may be further configured to determine whether to access the channel of the base station, based on the energy efficiency degree, the threshold value of the energy efficiency degree, and the amount of electric power.

In another general aspect, there is provided a method of accessing a channel using a mobile device, the method including: calculating an energy efficiency degree corresponding to a ratio of an amount of transmission of a data packet to an expected energy consumption, in response to the transmission of the data packet from the mobile device to a base station, setting a threshold value of the energy efficiency degree, and determining whether the mobile device accesses the channel of the base station, based on the threshold value of the energy efficiency degree.

In the method, the calculating may include calculating the energy efficiency degree, based on a data transmission link environment between the base station and the mobile device.

In the method, the energy efficiency degree may be determined based on an amount of electric power consumed for transmitting the data packet from the mobile device to the base station.

In the method, the threshold value of the energy efficiency degree may be determined by reflecting, in real time, a residual amount of a battery of the mobile device and a state of a queue including the data packet of the mobile device.

In the method, the setting may include setting the threshold value ($TH_t$) of the energy efficiency degree according to:

$$TH_t = \alpha \cdot TH_{min} + \beta \cdot \left\{ \left(1 - \frac{B_C}{B_{max}}\right) \cdot TH_{max} \right\}$$

$$\left( \alpha + \beta = 1, \alpha = \frac{Q_C}{Q_{max}} \right)$$

wherein: $TH_{min}$ indicates a minimal value of the threshold value, $TH_{max}$ indicates a maximal value of the threshold value, $B_{max}$ indicates a maximal capacity of the battery, $B_c$ indicates a current capacity of the battery, $Q_{max}$ indicates a maximal size of the queue, $Q_c$ indicates a current size of the queue, and $\alpha$ and $\beta$ indicate weighting factors.

The method may further include determining an amount of electric power according to the transmission of the data packet, based on the threshold value of the energy efficiency degree.

In the method, the determining of the amount of electric power may include determining the amount of electric power enabling the energy efficiency degree to be greater than or equal to the threshold value of the energy efficiency degree.

In the method, the determining of whether to access the channel may include determining whether to access the channel, based on the energy efficiency degree, the threshold value of the energy efficiency degree, and the amount of electric power.

A non-transitory computer-readable medium may include a program for instructing a computer to perform the method.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
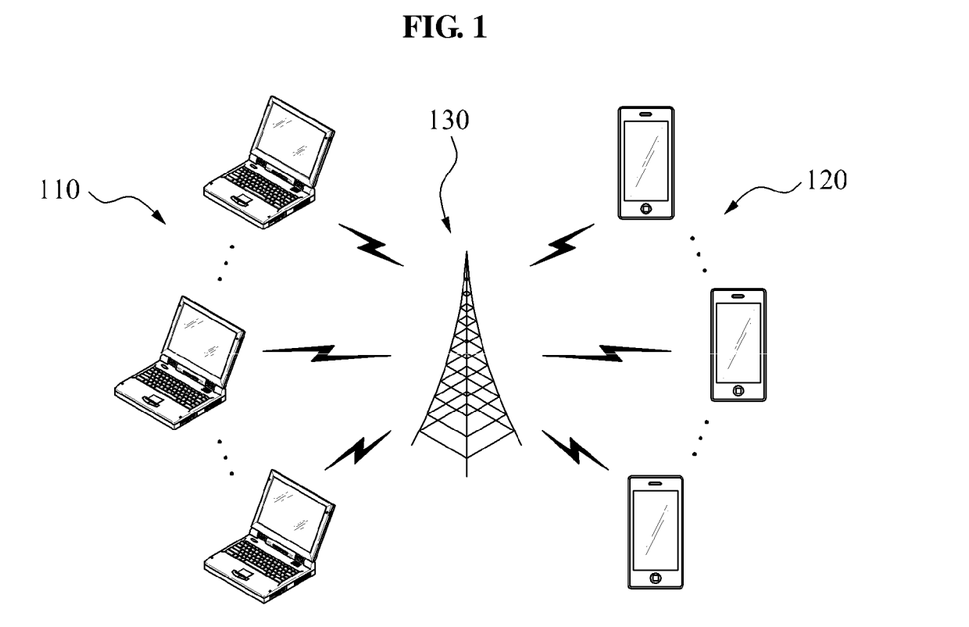
FIG. 1 is a diagram illustrating an example of a configuration of a wireless communication system.

FIG. 1 includes an example of a configuration of a wireless communication system.

Referring to FIG. 1, the wireless communication system, according to an embodiment, may include a mobile device, such as a laptop computer 110, a personal digital assistant (PDA) 120, and the like, which may enable a user to directly access the Internet; and a base station (access point) 130, which may connect the mobile device to the external Internet by configuring a link between the mobile device and the base station.

A data transmission in the wireless communication system may be classified into a forward link transmission, in which the base station 130 may transmit data to the mobile device, such as the laptop computer 110 and the PDA 120; and a reverse link transmission, in which each mobile device, such as the laptop computer 110 and the PDA 120, may transmit data to the base station 130.

Figure 2:
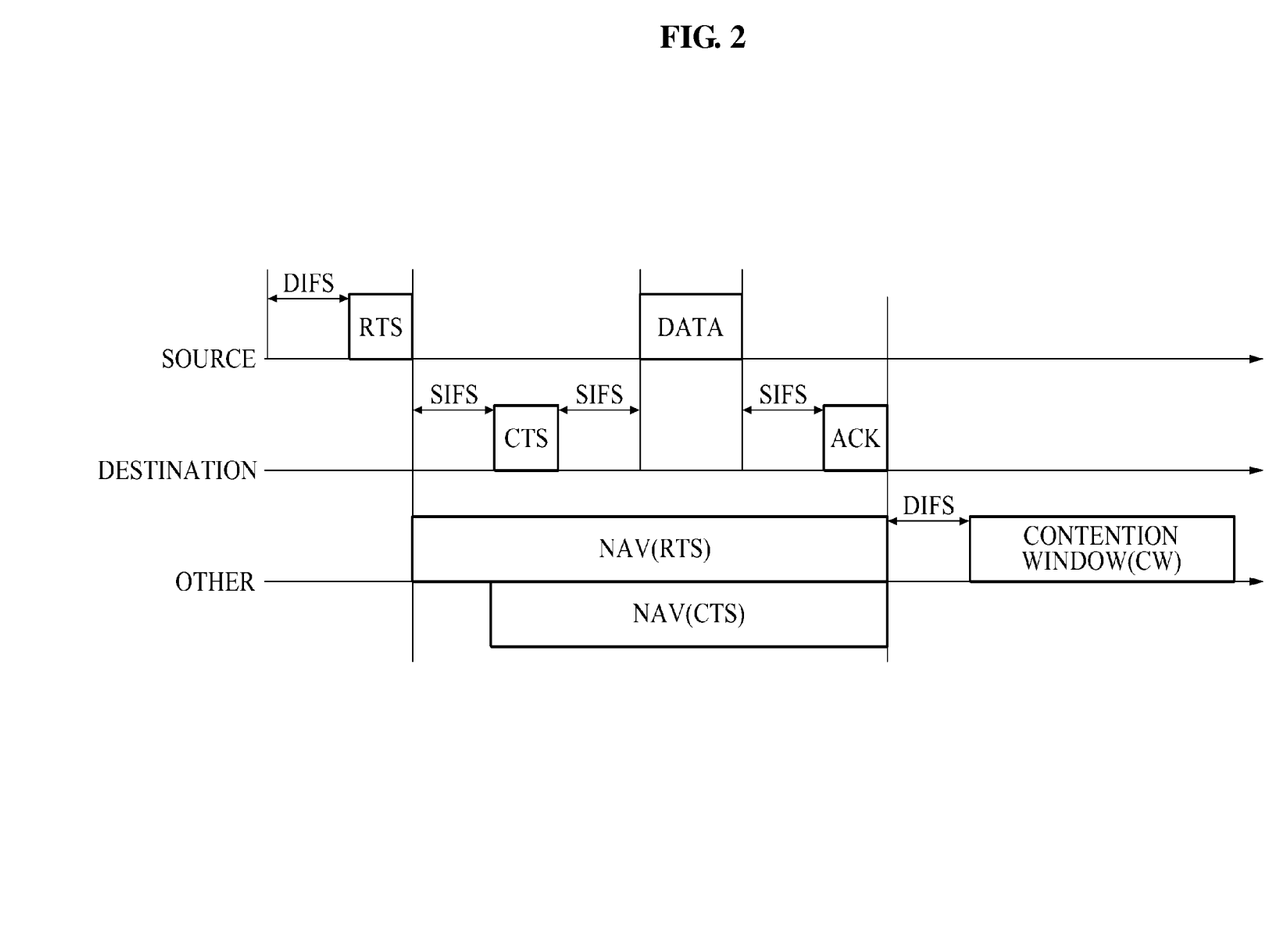
FIG. 2 is a diagram illustrating an example of a data transmission mode of a wireless communication system.

FIG. 2 includes an example of a data transmission mode of a wireless communication system.

Referring to FIG. 2, in the wireless communication system according to an embodiment, the base station 130 and the mobile devices, that is, the laptop computer 110 and the PDA 120, may contentiously access the same channel to exchange data. For example, a data transmission channel access and transmission scheme, based on a carrier sense multiple access/collision avoidance (CSMA/CA), may be applied.

As the example wireless communication system is configured to be applicable to a wireless communication environment using the CSMA/CA transmission scheme, the wireless communication system may be characterized by being compatible with and easily applicable to existing wireless communication technology without reconfiguration.

Figure 3:
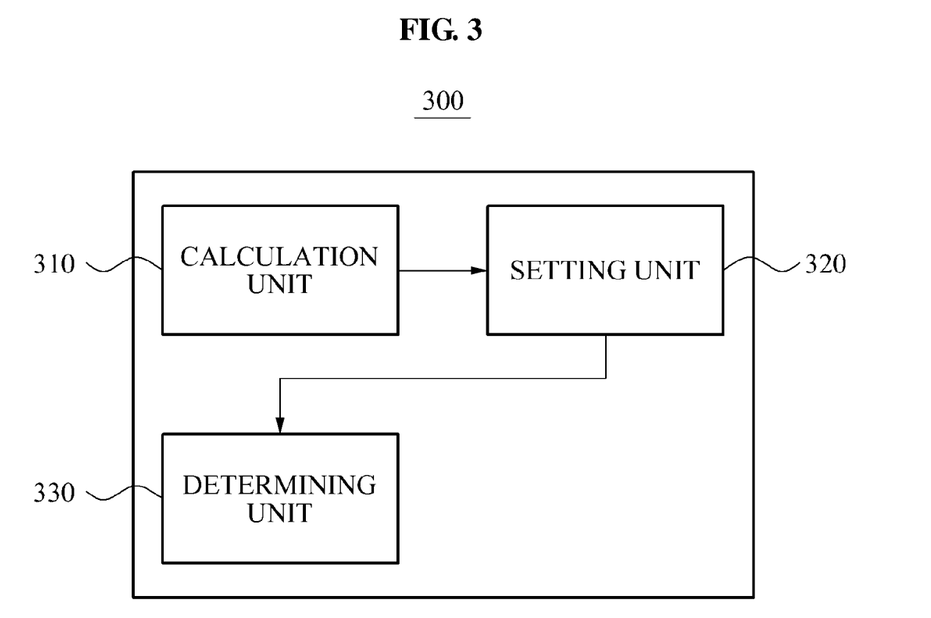
FIG. 3 is a block diagram illustrating an example of a configuration of a mobile device.

FIG. 3 includes an example of a configuration of a mobile device 300.

Referring to FIG. 3, the mobile device 300, according to an embodiment, may include a calculation unit 310 to calculate an energy efficiency degree corresponding to a ratio of an amount of transmission of a data packet to an expected energy consumption, in response to the transmission of the data packet to a base station; a setting unit 320 to set a threshold value of the energy efficiency degree; and a determining unit 330 to determine whether to access a channel of the base station, based on the threshold value of the energy efficiency degree.

The mobile device 300 may provide a scheme of determining a transmission power and whether to access the channel, in response to another device that uses the channel entering a contention window (CW) after terminating transmission of the data packet.

In response to the mobile device 300 determining accessing the channel, the mobile device 300 may transmit a ready to send (RTS) packet to the base station (see FIG. 2, RTS), and the base station receiving the RTS packet may transmit a confirm to send (CTS) packet to use the channel (see FIG. 2, CTS).

The mobile device 300 may transmit a retained data packet to the base station, and the base station receiving the data packet may transmit an acknowledgement (ACK) packet to the mobile device 300. Thus, whether the data is normally received may be reported (see FIG. 2, ACK). In one example, other mobile devices may recognize that the data transmission is finished by simultaneously receiving the ACK packet.

According to an embodiment, a CTS and ACK control packet of the base station may be transmitted with a maximum transmission power of the mobile device 300. In one example, mobile devices at a relatively long distance from the base station may receive the maximum transmission power to set a network allocation vector (NAV), and may prevent a hidden node problem and may prepare for a CW approach.

According to an embodiment, in response to the mobile device determining not to access the channel, the mobile device may be in a standby mode until the subsequent CW. Thus, a power supply to an internal component may be minimized to reduce an energy consumption.

Figure 4:
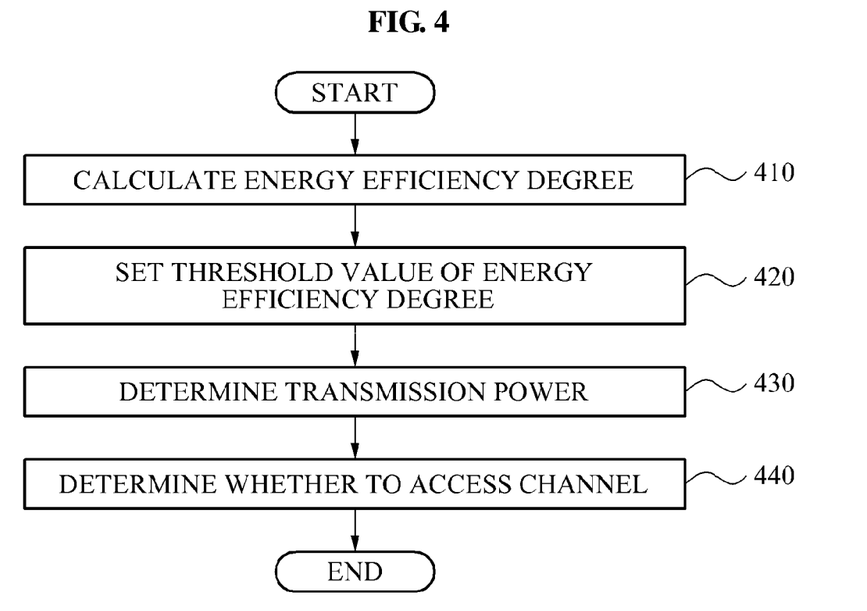
FIG. 4 is a flowchart illustrating an example of a scheme of accessing a channel using a mobile device.

FIG. 4 includes an example of a scheme of accessing a channel using a mobile device.

Referring to FIG. 4, the scheme of accessing the channel using the mobile device according to an embodiment may include the following operations to determine whether to access a channel, and to determine a transmission power consumed for transmitting data.

In operation 410, the calculation unit 310 of the mobile device 300 of FIG. 3, according to an embodiment, may calculate an energy efficiency degree, corresponding to a ratio of an amount of transmission of a data packet to an expected energy consumption, in response to the transmission of the data packet to a base station.

In operation 420, the setting unit 320 of the mobile device 300, according to an embodiment, may set a threshold value of the energy efficiency degree.

In operation 430, the determining unit 330 of the mobile device 300, according to an embodiment, may determine an amount of electric power according to the transmission of the data packet, based on the threshold value of the energy efficiency degree.

In operation 440, the determining unit 330 of the mobile device 300, according to an embodiment, may determine whether the mobile device accesses a channel of the base station, based on the threshold value of the energy efficiency degree.

The scheme of accessing the channel using the mobile device according to an embodiment will be further described.

Figure 5:
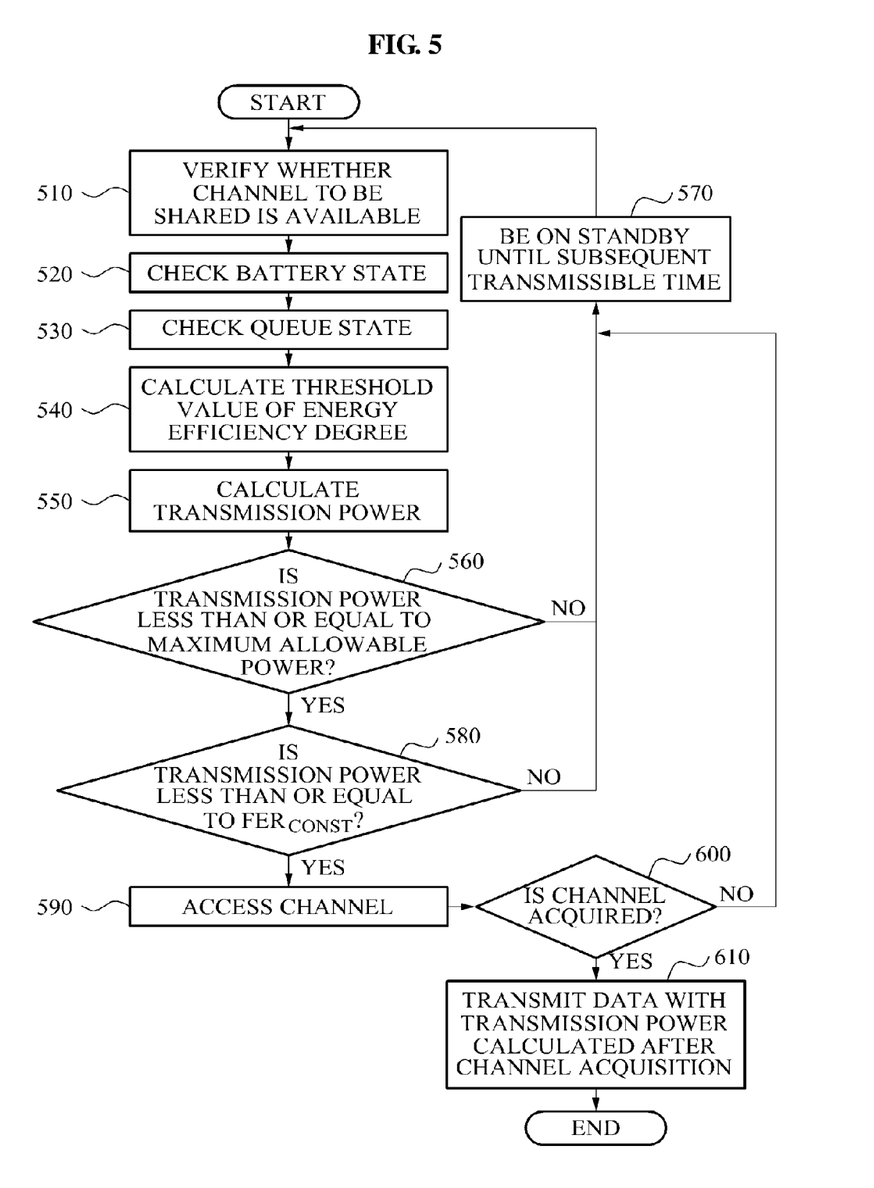
FIG. 5 is a flowchart further illustrating an example of a scheme of accessing a channel using a mobile device.

FIG. 5 includes an example of a scheme of accessing a channel using a mobile device.

Referring to FIG. 5, in operation 510, the mobile device may verify whether a channel that may be shared for a data transmission between the mobile device and the base station exists, and may verify whether the verified channel is available.

In operation 520 and operation 530, the mobile device may check a battery state and a queue state, respectively.

The calculation unit 310 of FIG. 3 of the mobile device may calculate the energy efficiency degree, based on a data transmission link environment between the mobile device and the base station.

According to an embodiment, the energy efficiency degree may be defined as a ratio of an expected amount of received data to an energy consumption, in an example of acquiring a channel to transmit a single data packet.

The energy efficiency degree may be determined, based on an amount of power consumption of the mobile device consumed for transmitting the data packet to the base station.

For example, in an example in which the data packet having data of L bits, excluding a header, is transmitted from the mobile device to the base station, an amount of data transmission may be L bits when the data packet is successfully transmitted to the base station.

However, the amount of data transmission may be defined as zero ("0") bits in an example in which a complete data transmission fails due to errors, such as instability of a transmission link, and the like, and thus, the amount of data transmission ($D_t$) may be defined according to the following Equation 1.

$$D_t = L \text{ (No Error)}$$

$$D_t = 0 \text{ (Error)} \qquad \text{[Equation 1]}$$

According to an embodiment, an example in which the data packet is not successfully transmitted and leaked out may be stochastically defined as a frame error rate (FER), and the FER may be defined according to Equation 2 below by using a bit error rate (BER) corresponding to an error probability of 1 bit as a probability that the entire packet is damaged due to an occurrence of an error of 1 bit or more in the data packet.

$$FER = 1 - (1-BER)^L \qquad \text{[Equation 2]}$$

According to an embodiment, the BER may be calculated by a signal-to-noise ratio (SNR) that may be mathematically predicted by a characteristic of a current transmission link and a transmission power of the mobile device.

According to an embodiment, the channel link environment during the data transmission in the SNR may be recognized by the mobile device in a CW step through various schemes, such as a control message transmission, a periodic beacon of the base station, and the like. When a noise power is presumed to be additionally known, the BER may correspond to a function depending on a packet transmission power (P) of the mobile device, and may be defined according to the following Equation 3.

$$BER = F(P) \qquad \text{[Equation 3]}$$

According to an embodiment, an expected value of the amount of data transmission ($D_t$) may be defined according to the following Equation 4.

$$\begin{aligned} D_t &= (1-FER) \cdot L + FER \cdot 0 \qquad \text{[Equation 4]} \\ &= \{1 - (1-(1-BER)^L)\} \cdot L \\ &= (1-BER)^L \cdot L \\ &= (1-F(P))^L \cdot L \end{aligned}$$

According to an embodiment, a value corresponding to an expected amount of energy consumed during the data packet transmission of the mobile device may be calculated, and the energy consumption $E_t$ may correspond to a transmission power multiplied by a transmission time, and may be defined according to the following Equation 5.

$$E_t = P \cdot T$$

$$T = T_{RTS} + T_{Data} \quad \text{[Equation 5]}$$

According to an embodiment, the transmission time (T) may correspond to a sum of a time used for transmitting an RTS packet of the mobile device and a time used for transmitting the data packet, and may be calculated through a length of the data packet and a data transmission rate for transmitting each packet of the mobile device.

According to an embodiment, through the above operations, an energy efficiency degree $\mu_t$ with respect to the data transmission of the mobile terminal may be defined according to the following Equation 6.

$$\mu_t = \frac{D_t}{E_t} \quad \text{[Equation 6]}$$

$$= \frac{(1 - F(P))^L \cdot L}{P \cdot T}$$

According to an embodiment, as the mobile terminal may be informed of the transmission time (T) and a data bit (L) in advance, the energy efficiency degree ($\mu_t$) may be defined according to Equation 6, depending on the transmission power (P).

According to an embodiment, the energy efficiency degree of the mobile terminal may have various values depending on a variation of the transmission power.

A setting unit of the mobile terminal according to an embodiment may set a threshold value of the energy efficiency degree.

According to an embodiment, the threshold value of the energy efficiency degree may be determined by reflecting, in real time, a residual amount of a battery and a state of a queue including the data packet.

According to an embodiment, a perceptible loss rate according to an energy use of the mobile device may vary, depending on each battery capacity, and as the residual amount of power of the battery decreases, a relatively greater energy loss may be perceived, even though an absolute energy consumption is the same.

According to an embodiment, the mobile device in one example may define a higher energy efficiency degree to be able to transmit a greater amount of data while consuming a minimal amount of energy possible.

Figure 6:
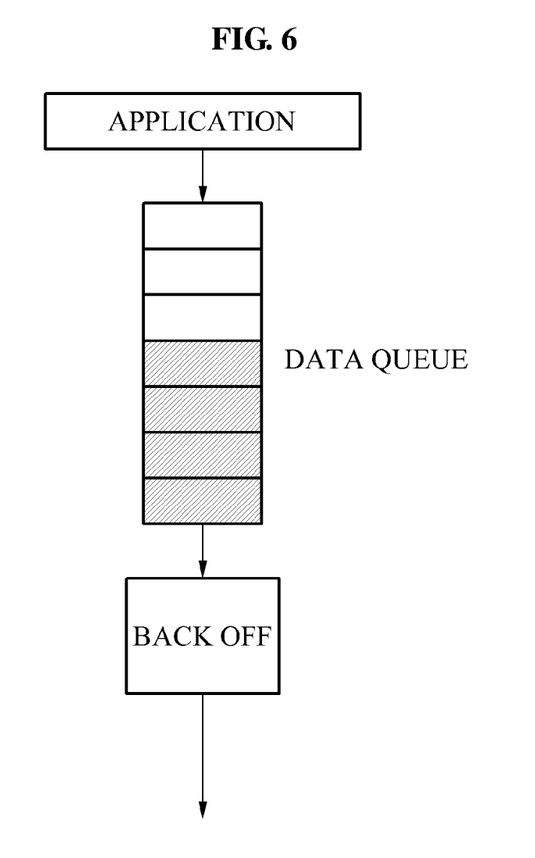
FIG. 6 is a diagram illustrating an example of a configuration of a data queue present inside a mobile device.

FIG. 6 includes an example of a configuration of a data queue present inside a mobile device.

Referring to FIG. 6, the mobile device according to an embodiment may load, in a data queue of the mobile device, data to be generated and transmitted in an upper application layer, and then may configure a packet by adding an appropriate header to the data, and may transmit the packet to the base station.

According to an embodiment, the data may be preferably loaded in the data queue as long as possible to prevent an energy consumption of the mobile device due to a frequent transmission trial of the mobile device.

According to an embodiment, in an example in which the data queue is completely filled up, the mobile device may not load subsequently received data in the data queue, and the data queue may overflow. To prevent a burden of recovering data lost in the overflow from the upper application layer and an excessive transmission delay, due to a transmission time delay, the data packet of the data queue may be appropriately processed within an appropriate period of time.

According to an embodiment, the setting unit 320 of FIG. 3 of each mobile device may check, in real time, a current state of the battery and the queue, and may reflect, in a setting, a threshold value (TH$_t$) of an energy efficiency degree defined according to the following Equation 7.

$$TH_t = \alpha \cdot TH_{min} + \beta \cdot \left\{ \left(1 - \frac{B_C}{B_{max}}\right) \cdot TH_{max} \right\} \quad \text{[Equation 7]}$$

$$\left(\alpha + \beta = 1, \alpha = \frac{Q_C}{Q_{max}}\right)$$

wherein, TH$_{min}$ indicates a minimal value of the threshold value, TH$_{max}$ indicates a maximal value of the threshold value, B$_{max}$ indicates a maximal capacity of the battery, B$_c$ indicates a current capacity of the battery, Q$_{max}$ indicates a maximal size of the queue, Q$_c$ indicates a current size of the queue, and $\alpha$ and $\beta$ indicate weighting factors.

According to an embodiment, the setting unit 320 may set the threshold value (TH$_t$) of the energy efficiency degree to increase in inverse proportion to the current capacity of the battery, in response to a decrease in the current size of the queue.

For example, in response to a length of the current queue being maintained below an appropriate level, the mobile device may maximally prevent an excessive energy consumption by emphasizing $\beta$ to set the threshold value of the energy efficiency degree to increase in inverse proportion to the current capacity of the battery, in consideration of the current state of the battery.

According to an embodiment, the setting unit 320 may set the threshold value (TH$_t$) of the energy efficiency degree to decrease, in response to an increase in the current size of the queue.

For example, in response to a length of the queue gradually increasing, as the data present inside the queue may be requested to be rapidly processed, the mobile device may set the threshold value of the energy efficiency degree to decrease by emphasizing $\alpha$ to adjust a reflection of TH$_{min}$ to increase.

In response to at least two queues existing, the setting unit 320 may either set the threshold value of the energy efficiency degree by totaling up sizes of the at least two queues, or may set the threshold value of the energy efficiency degree based on a queue having a maximal current size, among the at least two queues.

In operation 550, the determining unit 330 may determine the amount of electric power causing the energy efficiency degree to be greater than or equal to the threshold value of the energy efficiency degree.

According to an embodiment, the mobile device may calculate an optimal value of the transmission power (P) enabling the energy efficiency degree ($\mu_t$) to have a value greater than or equal to the TH$_t$.

For example, in operation 560, the mobile device may determine whether the current amount of the transmission power (P) exceeds a maximum allowable amount of the transmission power (P$_{max}$), and in an example of determining whether the current amount of the transmission power is less than or equal to the maximum allowable amount of the transmission power, the mobile device may control operational flow to proceed to the subsequent operation.

In an example of determining whether the current amount of the transmission power exceeds the maximum allowable amount of the transmission power, the mobile device may control operational flow to be on standby until a subsequent transmissible time.

In operation 580 and operation 590, to maintain an optimal quality of service (QoS), the mobile device may determine whether the FER exceeds a predetermined allowable value ($FER_{const}$) of the FER, and in an example in which the FER is less than or equal to the $FER_{const}$, the mobile device may control operational flow to access the channel.

The mobile device may extract the optimal value of the amount of the transmission power (P) satisfying the following Equation 8.

$$\arg_P \max(\mu_t(P) - TH_t) \qquad \text{[Equation 8]}$$

subject to
$\mu_t(P) \geq TH_t$
$P < P_{max}$
$FER < FER_{const}$

The determining unit 330 may determine whether to access the channel, based on the energy efficiency degree, the threshold value of the energy efficiency degree, and the amount of electric power.

For example, in response to the mobile device determining the amount of the transmission power satisfying Equation 8, the mobile device may determine a data packet transmission, and may access a shared channel in contention with other terminals.

In operation 600 and operation 610, the mobile device may determine whether the channel is acquired, and in an example in which the channel is acquired, the mobile device may transmit the data packet to the base station with the determined amount of the transmission power.

According to an embodiment, a scheme of accessing the transmission channel and setting the power capable of improving the energy efficiency degree of the mobile device may be provided.

According to an embodiment, the threshold value of the energy efficiency degree may be variably set, based on the state of the battery and the data queue of the mobile device, and the optimal transmission power calculation and whether to access the channel may be determined, based on the threshold value.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the devices described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop computer (e.g. personal computer (PC)), a global positioning system (GPS) navigation, and devices such as a desktop computer (e.g. PC), a high definition television (HDTV), an optical disc player, a setup and/or set top box, and the like, consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile device, comprising:
a calculation unit configured to calculate an energy efficiency degree, corresponding to a ratio of an amount of transmission of a data packet to an expected energy consumption, in response to the transmission of the data packet to a base station, wherein the energy efficiency is a ratio of an expected amount of received data to an energy consumption in acquiring a channel to transmit a single data packet;
a setting unit configured to set a threshold value of the energy efficiency degree; and
a determining unit configured to determine whether to access a channel of the base station, based on the threshold value of the energy efficiency degree.

2. The mobile device of claim 1, wherein the calculation unit is further configured to calculate the energy efficiency degree, based on a data transmission link environment between the base station and the mobile device.

3. The mobile device of claim 1, wherein the determining unit is further configured to determine an amount of electric power according to the transmission of the data packet, based on the threshold value of the energy efficiency degree.

4. The mobile device of claim 1, wherein the energy efficiency degree is determined based on an amount of electric power consumed for transmitting the data packet to the base station.

5. The mobile device of claim 1, wherein the threshold value of the energy efficiency degree is determined by reflecting, in real time, a residual amount of a battery and a state of a queue including the data packet.

6. The mobile device of claim 5, wherein the setting unit is further configured to set the threshold value ($TH_t$) of the energy efficiency degree according to:

$$TH_t = \alpha \cdot TH_{min} + \beta \cdot \left\{\left(1 - \frac{B_C}{B_{max}}\right) \cdot TH_{max}\right\}$$

$$\left(\alpha + \beta = 1, \alpha = \frac{Q_C}{Q_{max}}\right)$$

wherein:
$TH_{min}$ indicates a minimal value of the threshold value,
$TH_{max}$ indicates a maximal value of the threshold value,
$B_{max}$ indicates a maximal capacity of the battery,
$B_c$ indicates a current capacity of the battery,
$Q_{max}$ indicates a maximal size of the queue,
$Q_c$ indicates a current size of the queue, and
$\alpha$ and $\beta$ indicate weighting factors.

7. The mobile device of claim 6, wherein the setting unit is further configured to set the threshold value ($TH_t$) of the energy efficiency degree to increase in inverse proportion to the current capacity of the battery, in response to a decrease in the current size of the queue.

8. The mobile device of claim 6, wherein the setting unit is further configured to set the threshold value ($TH_t$) of the energy efficiency degree to decrease, in response to an increase in the current size of the queue.

9. The mobile device of claim 6, wherein, in response to at least two queues existing, the setting unit is further configured to either:
set the threshold value of the energy efficiency degree by totaling up sizes of the at least two queues; or
set the threshold value of the energy efficiency degree based on a queue comprising a maximal current size, among the at least two queues.

10. The mobile device of claim 3, wherein the determining unit is further configured to determine the amount of electric power enabling the energy efficiency degree to be greater than or equal to the threshold value of the energy efficiency degree.

11. The mobile device of claim 3, wherein the determining unit is further configured to determine whether to access the channel of the base station, based on the energy efficiency degree, the threshold value of the energy efficiency degree, and the amount of electric power.

12. A method of accessing a channel using a mobile device, the method comprising:
calculating an energy efficiency degree corresponding to a ratio of an amount of transmission of a data packet to an expected energy consumption, in response to the transmission of the data packet from the mobile device to a base station, wherein the energy efficiency is a ratio of an expected amount of received data to an energy consumption in acquiring a channel to transmit a single data packet;
setting a threshold value of the energy efficiency degree; and
determining whether the mobile device accesses the channel of the base station, based on the threshold value of the energy efficiency degree.

13. The method of claim 12, wherein the calculating comprises calculating the energy efficiency degree, based on a data transmission link environment between the base station and the mobile device.

14. The method of claim 12, wherein the energy efficiency degree is determined based on an amount of electric power consumed for transmitting the data packet from the mobile device to the base station.

15. The method of claim 12, wherein the threshold value of the energy efficiency degree is determined by reflecting, in real time, a residual amount of a battery of the mobile device and a state of a queue including the data packet of the mobile device.

16. The method of claim 15, wherein the setting comprises setting the threshold value ($TH_t$) of the energy efficiency degree according to:

$$TH_t = \alpha \cdot TH_{min} + \beta \cdot \left\{\left(1 - \frac{B_C}{B_{max}}\right) \cdot TH_{max}\right\}$$

$$\left(\alpha + \beta = 1, \alpha = \frac{Q_C}{Q_{max}}\right)$$

wherein:
$TH_{min}$ indicates a minimal value of the threshold value,
$TH_{max}$ indicates a maximal value of the threshold value,
$B_{max}$ indicates a maximal capacity of the battery, $B_c$ indicates a current capacity of the battery,
$Q_{max}$ indicates a maximal size of the queue,
$Q_c$ indicates a current size of the queue, and
$\alpha$ and $\beta$ indicate weighting factors.

17. The method of claim 12, further comprising determining an amount of electric power according to the transmission of the data packet, based on the threshold value of the energy efficiency degree.

18. The method of claim 17, wherein the determining of the amount of electric power comprises determining the amount of electric power enabling the energy efficiency degree to be greater than or equal to the threshold value of the energy efficiency degree.

19. The method of claim 17, wherein the determining of whether to access the channel comprises determining whether to access the channel, based on the energy efficiency degree, the threshold value of the energy efficiency degree, and the amount of electric power.

20. A non-transitory computer-readable medium comprising a program for instructing a computer to perform the method of claim 12.

* * * * *